Patented Jan. 5, 1937

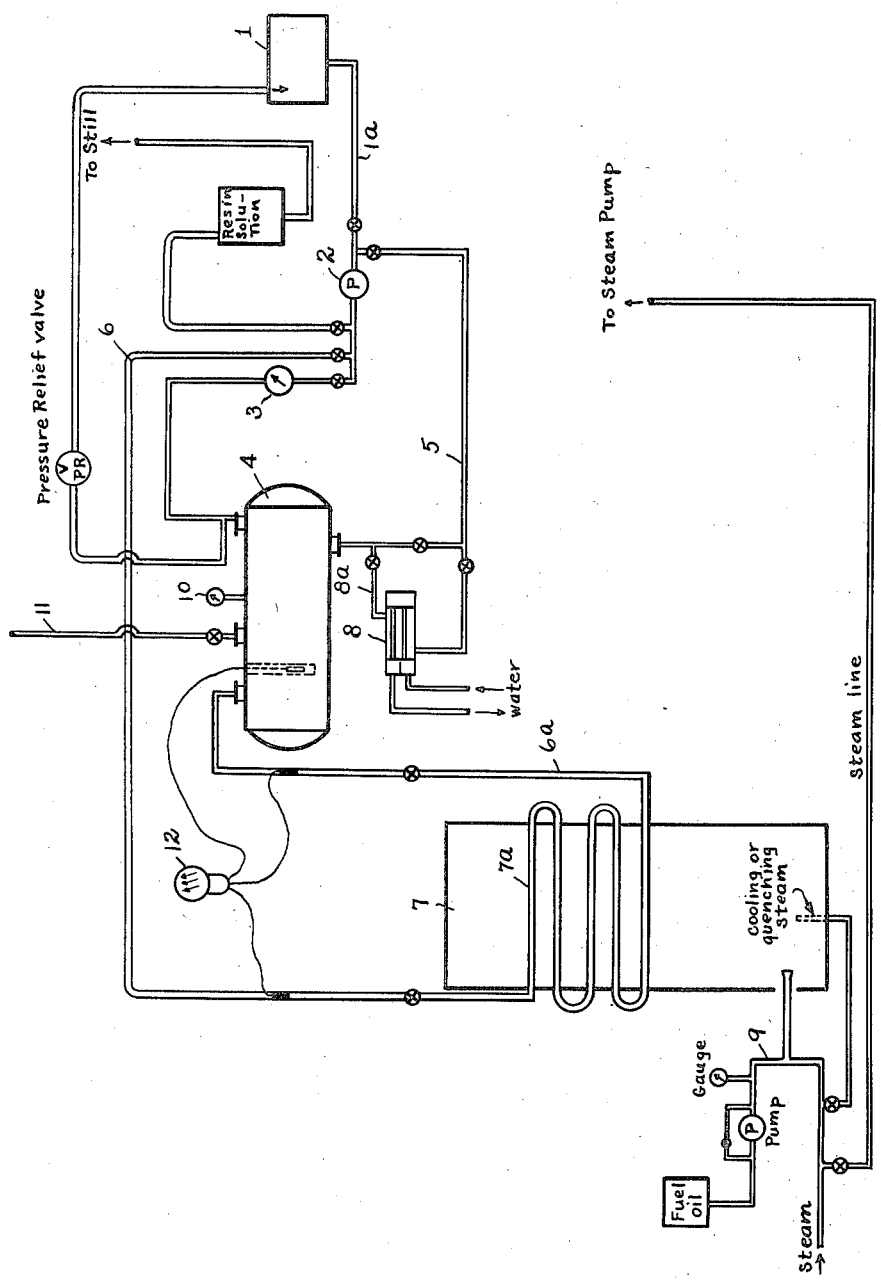

2,067,073

UNITED STATES PATENT OFFICE 2,067,073

HEAT POLYMERIZATION

William H. Carmody, Pittsburgh, Pa., assignor to The Neville Company, a corporation of Pennsylvania Application February 17, 1936, Serial No. 64,334

8 Claims. (Cl. 260—7)

This invention relates to a resin-forming polymerization in crude solvent naphtha of particular characteristics.

Certain grades of crude solvent naphtha are not susceptible of satisfactory polymerization by chemical polymerizing agents, such as sulphuric acid. Such crudes, typified by crude solvent naphtha as produced from the operation of by-product ovens at Gary, Indiana, have a large percentage inclusion of dicyclopentadiene, and a relatively small percentage inclusion of indene and coumarone polymerizables. The resin produced from such crudes, by polymerization, is in all fundamental physical respects similar to a coumarone-indene resin produced from No. 2 crude solvent naphtha. It does, however, tend to produce dark resins under most conditions of polymerization, and under the stimulus of most chemical catalysts not only enters with great violence into the polymerizing reaction, but also reacts with the oxidizing catalysts such as sulphuric acid, nitric acid, and phosphoric acid, to produce products of reaction other than polymerization products.

It is known that polymerization to produce resins may be conducted by the subjection of crude solvent naphtha to elevated temperature, in the absence of an added material, serving catalytically to promote the process of polymerization. My invention, however, relates to the conduct of heat polymerization upon a crude solvent naphtha, comprising dicyclopentadiene, as its chief polymerizable ingredient, in such manner as to obtain a resultant resin of usable qualities and good color.

Whereas it has been generally observed that the polymerization products of crude solvent naphtha, subjected to heat polymerization, tend to be darker with higher polymerization temperatures and lighter with lower polymerization temperatures, I have found that, in working with crude solvent naphtha of a primarily dicyclopentadiene structure, I can obtain satisfactory results by working within a relatively narrow temperature range, and maintaining such conditions of polymerization that conditions tending to darken the resin are avoided. Also, I have discovered that, in conducting polymerization under relatively low temperature, I am able to obtain a high percentage polymerization from a crude containing a high percentage of polymerizables, without decomposition of the reactives.

Briefly to summarize my procedure, I subject crude solvent naphtha of a type to consist chiefly of dicyclopentadiene in a closed vessel, to a polymerization temperature of from 200° C. to 250° C., and prefer to polymerize within the relatively narrow temperature range from 235° C. to 250° C.

The accompanying drawing shows diagrammatically an exemplary installation for conducting my method of polymerization.

In the drawing, reference numeral 1 designates a source of immediate supply of a crude solvent naphtha containing preponderantly dicyclopentadiene as its polymerizable reactive. From container 1 a line 1a leads, by way of a steam pump 2 and a meter 3, to a polymerizing vessel 4. The installation comprises, as shown, a circulating system by which the contents of the polymerizing vessel may, under the influence of pump 2, be passed through lines 5 and 6, through the coil 7a of a coil heater 7, and by return line 6a back to the polymerizing vessel. A water cooler 8, in a by-pass 8a of line 5, serves to cool the charge of the polymerizing vessel when polymerization has been completed; and suitable heating apparatus, such as the oil burner 9, serves to supply heat to the heating coil 7a.

While the installation shown is wholly exemplary, in the arrangement shown it is of importance that the heating coil 7a be of small gauge, and that the circulating pump be capable of circulating the naphtha subjected to polymerization through the heating coil at a relatively high speed. Because of the factors involved in my method, it is also of importance that the polymerizing vessel be provided, as shown, with a pressure gauge 10 and with a valved vent 11. It is also of importance that means for observation of temperature in the lines leading to and from the heating coils, and in the polymerizing vessel, be made observable by some means, such as the temperature recorder 12 shown in the drawing.

Considering both the type of crude solvent naphtha containing largely or preponderantly dicyclopentadiene, and those lower boiling cuts, such as the xylol cut from the same initial stock as the crude heavy solvent naphtha containing preponderantly coumarone and indene as its polymerizable content, there is identical difficulty in so conducting polymerization as to produce a resin of light color. This is, as stated above, due to the violence with which dicyclopentadiene, styrene, and like resin-forming reactives enter into a polymerizing reaction, and to their tendency to form reaction products with a polymerization-promoting catalyst.

Because of these inherent difficulties involved in their subjection to polymerizing treatment, neither the crude solvent naphtha, containing largely or preponderantly dicyclopentadiene, nor the lower boiling cuts of crude solvent naphthas, such as the xylol cut, containing some content of styrene and the like, have been used to any substantial extent as the source of commercial resins.

Returning to a specific description of my method of effecting polymerization in such naphthas containing polymerizables more reactive than coumarone and indene, the polymerizing vessel is first charged with the crude naphtha. Circulation of the naphtha is then effected until the body of the liquid within the polymerizing vessel has been raised to a point at which its temperature approximates 160° C., with an approximate 25 pound attendant pressure within the polymerizing vessel. As the rise in temperature of the body of liquid is caused by heating small volumes of the liquid itself continuously, and continuously returning such small volumes to the main body of liquid, the heating effect in the polymerizing vessel is gently progressive. When the indicated stage of the treatment has been reached, the polymerizing vessel is vented to the atmosphere, thus flushing out air from the vessel with the out-rush of vapors therefrom. The polymerizing vessel is then resealed, and circulation of the naphtha to and from the heating coil is continued, further to raise and to maintain the temperature of the body of liquid.

By conducting heat polymerization in the polymerizing vessel from which air is wholly excluded, the atmosphere within the vessel consisting of vapors of the liquid undergoing polymerization itself, I am able to prevent oxidation in the liquid, and thereby am able to control darkening of the resin produced by the polymerization treatment.

With the above-noted conditions established, the polymerization-promoting heating is continued to a point at which the temperature of the naphtha in the polymerizing vessel is within the range of from 235° C. to 250° C. I have found that, in spite of all other precautions, the production of a dark resin occurs, as the temperature of the main body of treated liquid is permitted to rise substantially above 250° C. Thus, I have noted a marked darkening effect under a temperature no higher than 265° C., and have observed that such temperature results in a reaction apparently involving the decomposition of some constituent of the crude naphtha. For this reason, it is desirable that the polymerization be conducted closer to the temperature of 235° C. than to the maximum suitable temperature of 250° C., in order that moderate unobserved rise of temperature may not result in deterioration of the produced resin.

In the light of the foregoing, it will be seen that the utilization of a small gauge heating coil, and a high speed of circulation, contributes substantially to the result desired. This high-speed circulation of the liquid through a small bore coil conforms to temperature control in the main body of liquid, in that the actual heat units, transferred by the detached quantity of liquid in the coil, are rigidly limited, while the speed of circulation both prevents decomposition in the heating coil, and prevents coking in the coil as a result of such decomposition. By regulating the speed of circulation of the liquid, I am able to obtain a temperature control finer than that obtainable by regulation of the heater temperature alone, and the main body of liquid is protected against sudden temperature rise.

The temperature of the crude solvent naphtha in the polymerizing vessel having been raised to a point effective in producing polymerization without deterioration in the quality of the resin produced, I maintain the liquid at such polymerizing temperature, and free from the presence of oxygen, for a polymerization period of from approximately 20 to 24 hours. At the termination of such period, polymerization may be considered substantially complete, and the liquid containing the polymerized bodies is drawn off to a still in which it is separated into solvent liquids, bodies in the lower stages of polymerization, such as dimers, which form the heavy liquid termed "heavy oil", and the solid resin. Because of the absence of a chemical polymerization-promoting reagent, the recovery stage of my method does not involve the relatively laborious steps of neutralization and washing which follow necessarily a polymerization promoted by chemical reagents.

Polymerization having been conducted in the manner described, at a temperature below a rigidly defined maximum, and in the absence of oxygen, the resultant resins, both of the hard grade and of the soft fluid grade known as heavy oil, are of a clear reddish, or relatively light amber, color. Both the dicyclopentadiene resin so produced, and a resin consisting largely of styrene, and similar polymerizables, have good solubility associated with relatively high melting-point. For example, from the dicyclopentadiene crude I have obtained a resin having a melting-point of 100° C. and a definite precipitation from a 20% solution in Stoddard solvent naphtha at 8° C.; and have also, by distilling the dicyclopentadiene resin with both steam and vacuum, obtained a resin having a melting-point of 132° C. and a definite precipitation from a 20% solution in Stoddard solvent naphtha at 12° C.

Considering also both types of crude, namely, a crude solvent naphtha containing largely or preponderantly dicyclopentadiene as its polymerizable reactive and a lower boiling cut from the initial stock containing coumarone and indense, which cut contains styrene and like bodies, it is noteworthy that I am able successfully and economically to effect polymerization in such liquids containing high concentrations of the polymerizables. For example, working with a dicyclopentadiene crude of the Gary type, consisting of 80% polymerizables, I have effected 70% resin recovery; that is, a recovery of 7/8 of the theoretically possible recovery. It may be stated generally that the higher the proportion of polymerizables in the crude solvent naphtha, subjected to treatment by my method, the more efficient will the process be. This efficiency, as indicated, is obtained without detriment to the quality of the resin produced.

It is to be emphasized that the installation shown in the drawing is exemplary merely, and that any installation which is capable of effecting polymerization in the absence of oxygen, and of rigidly controlling the polymerization temperature, is usable. For example, the crude solvent naphtha may be heated by means of coils immersed in the body of naphtha in the polymerizing vessel, and used to conduct a heat-transferring fluid, such as hot oil. The circulation of the liquid subjected to the polymerization itself is, however, the most satisfactory mode of raising and rigidly controlling the temperature of the liquid subjected to treatment.

I claim as my invention:

1. The herein described polymerization step in a method of producing resin of high quality from the polymerizable reactives more reactive than coumarone and indene contained in a crude solvent naphtha, which comprises subjecting a crude solvent naphtha containing in substantial proportion such reactives in the absence of oxygen and in the absence of a polymerization-promoting reagent to a relatively prolonged heat treatment at a temperature gradually raised to substantially above 200° C. and at no time substantially exceeding 250° C.

2. The herein described polymerization step in a method of producing resin of high quality from a crude solvent naphtha containing dicyclopentadiene in substantial proportion which comprises subjecting such crude solvent naphtha in the absence of oxygen and in the absence of a polymerization-promoting reagent to a relatively prolonged heat treatment at a temperature gradually raised to substantially above 200° C. and at no time substantially exceeding 250° C.

3. The herein described polymerization step in a method of producing resin of high quality from the polymerizable reactives more reactive than coumarone and indene contained in crude solvent naphtha, which comprises subjecting a crude solvent naphtha containing in substantial proportion such reactives in a closed vessel to a temperature adequate to produce substantial vaporization of the naphtha, by venting the vapors of the naphtha flushing air from the vessel containing the naphtha, and subjecting the naphtha to a relatively prolonged heat treatment in the absence of air and in the absence of a polymerization-promoting reagent at a temperature gradually raised to substantially above 200° C. and at no time substantially exceeding 250° C.

4. The herein described polymerization step in a method of producing resin of high quality from a crude solvent naphtha containing dicyclopentadiene in a substantial proportion, which comprises subjecting a crude solvent naphtha containing in substantial proportion such reactives in a closed vessel to a temperature adequate to produce substantial vaporization of the naphtha, by venting the vapors of the naphtha flushing air from the vessel containing the naphtha, and subjecting the naphtha to a relatively prolonged heat treatment in the absence of air and in the absence of a polymerization-promoting reagent at a temperature gradually raised to substantially above 200° C. and at no time substantially exceeding 250° C.

5. The herein described polymerization step in accordance with the procedure of claim 1, in which heating is effected by circulating the naphtha in a small volume stream between the main body of the naphtha subjected to treatment and a source of heat.

6. The herein described polymerization step in accordance with the procedure of claim 2, in which heating is effected by circulating the naphtha in a small volume stream between the main body of the naphtha subjected to treatment and a source of heat.

7. The herein described polymerization step in accordance with the procedure of claim 3, in which heating the naphtha is effected by circulating a small volume stream of the naphtha between the closed polymerizing vessel and a source of heat.

8. The herein described polymerization step in accordance with the procedure of claim 4, in which heating the naphtha is effected by circulating a small volume stream of the naphtha between the closed polymerizing vessel and a source of heat.

WILLIAM H. CARMODY.